US012631536B2

(12) United States Patent
Mai

(10) Patent No.: US 12,631,536 B2
(45) Date of Patent: May 19, 2026

(54) EQUIVALENT TEST METHOD OF PISTON VIBRATING MACHINE AND ROCKER-ARM VIBRATING MACHINE APPLIED IN HALF BREAKDOWN TIME TEST

(71) Applicant: CHINA NORTH STANDARDIZATION CENTER, Beijing (CN)

(72) Inventor: Lyubo Mai, Beijing (CN)

(73) Assignee: CHINA NORTH STANDARDIZATION CENTER, Beijing (CN)

( * ) Notice: Subject to any disclaimer, the term of this patent is extended or adjusted under 35 U.S.C. 154(b) by 265 days.

(21) Appl. No.: 18/355,883

(22) Filed: Jul. 20, 2023

(65) Prior Publication Data

US 2023/0358657 A1 Nov. 9, 2023

Related U.S. Application Data

(63) Continuation of application No. PCT/CN2023/092639, filed on May 8, 2023.

(30) Foreign Application Priority Data

Apr. 13, 2023 (CN) .......................... 202310397863.6

(51) Int. Cl.
*G01N 3/34* (2006.01)
*G01N 3/36* (2006.01)

(52) U.S. Cl.
CPC ................. *G01N 3/34* (2013.01); *G01N 3/36* (2013.01); *G01N 2203/0005* (2013.01); *G01N 2203/0039* (2013.01); *G01N 2203/0048* (2013.01)

(58) Field of Classification Search
CPC .............. G01N 3/32; G01N 3/34; G01N 3/36
See application file for complete search history.

(56) References Cited

FOREIGN PATENT DOCUMENTS

CN 2111522 U 7/1992
CN 103076244 A 5/2013
(Continued)

OTHER PUBLICATIONS

Mai et al., Equivalent Test Method of Rocker Arm Type and Piston Type Vibrator, Mar. 2021, Espacenet Machine Translation (Year: 2021).*

(Continued)

*Primary Examiner* — Erika J. Villaluna

(57) ABSTRACT

An equivalent test method of a piston vibrating machine and a rocker-arm vibrating machine applied in half breakdown time test, including: selecting three grades of samples in the same size specification; separately selecting frequencies of the piston vibrating machine and the rocker-arm vibrating machine; estimating impact times of the two vibrating machines for three grades of samples; setting up the impact times and separately impacting the samples with the two vibrating machines; sieving and weighing the impacted samples and obtaining the unbroken ratios; calculating impact cycles with an unbroken ratio of 50%; calculating the ratios of the impact cycles of the two vibrating machines for the samples; calculating an average of the ratios; calculating the relative percentages of impact cycle ratios for the three grades and assessing the linearity of the samples; and calculating equivalent impact cycles of the vibrating machines.

8 Claims, 5 Drawing Sheets

(56)                    References Cited

FOREIGN PATENT DOCUMENTS

| | | | |
|---|---|---|---|
| CN | 104075935 | A | 10/2014 |
| CN | 112557174 | A | 3/2021 |
| CN | 113877666 | A | 1/2022 |
| JP | H03251736 | A | 11/1991 |
| SU | 911193 | A1 | 3/1982 |

OTHER PUBLICATIONS

Songqiao Tian et al., "Measurement Method for Impact Toughness of Superhard Abrasives—Discussion on CYCJ-91A Impact Toughness Tester", Diamond & Abrasives Engineering, Apr. 15, 1994, No. 2, pp. 31-32.
Junxiang Zhang et al., "Impact Toughness Test Technique for Superabrasive Grits and Its Application", Diamond & Abrasives Engineering, Aug. 30, 2003, Serial. 136, No. 4, pp. 79-80.

* cited by examiner

EQUIVALENT TEST METHOD OF PISTON VIBRATING MACHINE AND ROCKER-ARM VIBRATING MACHINE APPLIED IN HALF BREAKDOWN TIME TEST

CROSS-REFERENCE TO RELATED APPLICATIONS

This application is a continuation of International Application No. PCT/CN2023/092639 with a filing date of May 8, 2023, designating the United States, now pending, and further claims the benefit of priority from Chinese Patent Application No. 202310397863.6, filed on Apr. 13, 2023. The content of the aforementioned application, including any intervening amendments thereto, is incorporated herein by reference in its entirety.

TECHNICAL FIELD

This application relates to testing of impact toughness of superabrasives, and more particularly to an equivalent test method of a piston vibrating machine and a rocker-arm vibrating machine applied in half breakdown time test.

BACKGROUND

The piston vibrating machine and the rocker-arm vibrating machine play an important role in testing the impact toughness of superabrasives. The superabrasives generally refer to abrasives with extremely high hardness (such as diamond and cubic boron nitride), and are mainly used as core elements for cutting tools and grinding tools. The impact toughness is one of the most important performance indicators of the superabrasive. There are two test methods for the impact toughness measurement of superabrasive in the world, namely a half breakdown time test method and an unbroken ratio test method. These two test methods are completely different in test process, expression index (evaluation index) and calculation formula. Specifically, for the half breakdown time test method, the impact toughness of superabrasives is expressed by the test time or the number of impact cycles of the sample half breakdown (the test time can be converted into the number of impact cycles); and regarding the unbroken ratio test method, the impact toughness is expressed by the proportion of the unbroken sample amount in the total sample amount. And these two test methods are also greatly different in test process and calculation complexity. They have their own outstanding advantages. By comparison, the half breakdown time test method is more complex than the unbroken ratio test method in terms of calculating formulas and testing processes. Both of the two test methods can be performed by using a piston vibrating machine or a rocker-arm vibrating machine.

As mentioned above, the half breakdown time test method and the unbroken ratio test method are implemented mainly via the piston vibrating machine and the rocker-arm vibrating machine, which are entirely different from each other in design principle and structure. Regarding the piston vibrating machine, the impact tube loaded with superabrasives is driven to impact the superabrasives through the linear reciprocating motion of the piston. The piston vibrating machine generally includes an impact tube 1, an impact tube frame 2, a connection rod 3, a drive wheel 4, a motor shaft 5, and a piston 6, as shown in FIG. 1. For the rocker-arm vibrating machine, the impact tube loaded with superabrasives is driven to impact the superabrasives through the swinging reciprocating motion. The rocker-arm vibrating machine includes an impact tube 1, an impact tube frame 2, a connecting rod 3, a drive wheel 4, a motor shaft 5, a rocker arm 6', and a rocker arm shaft 7, as shown in FIG. 2. The two types of vibrating machines have their own advantages and disadvantages. The rocker-arm vibrating machine has the advantages of more impact cycles and longer working time, and is suitable for use in production inspection, but it has larger size and more weight. On the contrary, the piston vibrating machine has less size and weight, but it is prone to heat generation and thus fails to work continuously for a long time. The piston vibrating machine is suitable for precision testing and arbitration testing.

The application distributions of the two test methods and the two vibrating machines are different in various regions of the world. The half breakdown time test method is preferred by the USA, Europe, and some Asian countries (such as Japan), while the unbroken ratio test method is mainly used in China. The rocker-arm vibrating machine is more popular than the piston vibrating machine in the USA, Japan, and China, while most of the European countries show preference to the piston vibrating machine.

When the two types of vibrating machines are applied to the testing of the same superabrasive sample by the same test method (half breakdown time method or unbroken ratio method), the obtained test results are completely different, which will make the performance evaluation of the same superabrasive sample inconsistent among producers and users from different regions and also seriously affect the uniform evaluation on the performance of superabrasives and the development of international trade.

Considering that the two test methods have their own advantages, and are different in regional application distribution, it is impossible to integrate the two test methods. Moreover, since the two vibrating machines also have their own advantages, and a great deal of investment has been made in them, and they are also used habitually by their owners, it is also impossible to unify the test machines by replacing one type of vibrating machine with another. Therefore, it requires technical means to achieve the unification (standardization) of test results of the same superabrasive using the two types of vibrating machines through the same test method. The equivalent test method of a piston vibrating machine and a rocker-arm vibrating machine applied in the unbroken ratio test method has been patented (Chinese patent No. 112557174 B, titled "An equivalent test method for a piston vibrating machine and a rocker-arm vibrating machine"). However, the equivalent test method of a piston vibrating machine and a rocker-arm vibrating machine when applied to the half breakdown time test method for the same sample is too complex, and is still absent. Whereas, the half breakdown time test method is the most frequently-used test method in the world and both types of vibrating machines are all used in the half breakdown time test method by a large number of companies in the world.

For the same test sample, the test results obtained by the piston vibrating machine and the rocker-arm vibrating machine through the half breakdown time test method are quite different. For example, for a high-grade sample with a size of D426, the test results obtained by the piston vibrating machine and the rocker-arm vibrating machine are 260 s and 150 s, respectively. Hence, for the superabrasive manufactures and users (e.g., the cutting tool manufacturers) using different test machines, it is impossible to achieve the uniform and consistent evaluation of the superabrasive performance. As a result, the performance indicators provided by superabrasive manufacturers using different test machines are not comparable. Similarly, the users are also unable to confirm the performance level of the superabrasives supplied by manufacturers due to inconsistency of the test equipment, that is, the performance of superabrasives with long half-breakdown time provided by the manufacturer may be not necessarily high, and the performance of superabrasives with short half-breakdown time tested by the user may be not necessarily low. The inconsistent test results indicate there is no consistent standard to evaluate the performance indicator of superabrasives in procurement and delivery, which seriously affects the domestic and international trade of superabrasives, and brings many trade disputes. Therefore, it is urgent in the field of superabrasives to develop an equivalent test method of the two types of vibrating machines applied in the half breakdown test to unify the test results of the two types of vibrating chines, which is a worldwide difficult technical problem of the superabrasive field.

SUMMARY

An object of the present disclosure is to provide an equivalent test method of a piston vibrating machine and a rocker-arm vibrating machine applied in half breakdown time test, to render test results obtained by such two types of vibrating machines consistent while testing the same sample by using the most widely used half-breakdown time test method, thereby effectively avoiding the loss of the investment and training cost resulted from the replacement of one type of vibrating machine with another type of vibrating machine. By using the equivalent test method provided herein, the test results obtained by the piston vibrating machine and the rocker-arm vibrating machine through the half breakdown method are comparable and consistent worldwide.

In a first aspect, this application provides an equivalent test method of a piston vibrating machine and a rocker-arm vibrating machine applied in half breakdown time test, comprising:

(S1) selecting high-grade samples, medium-grade samples and low-grade samples of a size specification $S_i$; wherein i represents superabrasive size designation; and at least four batches of the same samples are prepared for each grade;

(S2) separately setting a vibration frequency $f_r$ of the rocker-arm vibrating machine and a vibration frequency $f_p$ of the piston vibrating machine;

(S3) separately estimating impact times $t_{rH1}$, $t_{rM1}$, and $t_{rL1}$ of the rocker-arm vibrating machine for the high-grade samples, the medium-grade samples and the low-grade samples, with which times unbroken ratios of the three grade samples after being impacted can reach 45%-50%; and separately estimating impact times $t_{pH1}$, $t_{pM1}$, and $t_{pL1}$ of the piston vibrating machine for the high-grade samples, the medium-grade samples and the low-grade samples, with which unbroken ratios of the three grade samples after being tested can reach 45%-50%;

(S4) setting up an impact time $T_{rH1}$ of the rocker-arm vibrating machine for the high-grade samples according to estimated impact time $t_{rH1}$; loading one of the high-grade samples into a capsule of the rocker-arm vibrating machine; installing the capsule in the rocker-arm vibrating machine; and starting the rocker-arm vibrating machine for impact test; and setting up an impact time $T_{pH1}$ of the piston vibrating machine for the high-grade samples according to estimated impact time $t_{pH1}$; loading another of the high-grade samples into a capsule of the piston vibrating machine; installing the capsule in the piston vibrating machine; and starting the piston vibrating machine for impact test;

(S5) sieving and weighing an impacted high-grade sample from the rocker-arm vibrating machine with the impact time $T_{rH1}$ to obtain an unbroken ratio $P_{rH1}$; and sieving and weighing an impacted high-grade sample from the piston vibrating machine with the impact time $T_{pH1}$ to obtain an unbroken ratio $P_{pH1}$, wherein $P_{rH1}$ and $P_{pH1}$ are 45%-50%;

(S6) if the unbroken ratio $P_{rH1}$ or $P_{pH1}$ is less than 45%, appropriately shortening the impact time of the rocker-arm vibrating machine or the piston vibrating machine, repeating steps (S4)-(S5) until the unbroken ratios $P_{rH1}$ and $P_{pH1}$ are within 45%-50%, and at this time, recording the impact time $T_{rH1}$ of the rocker-arm vibrating machine and its corresponding unbroken ratio $P_{rH1}$, and the impact time $T_{pH1}$ of the piston vibrating machine and its corresponding unbroken ratio $P_{pH1}$;

(S7) according to steps (S4)-(S6), respectively impacting the medium-grade sample and the low-grade sample with the rocker-arm vibrating machine or the piston vibrating machine with their corresponding estimated impact time $t_{rM1}$ and $t_{rL1}$ or $t_{pM1}$ and $t_{pL1}$, and then sieving and weighing the impacted samples to obtain the unbroken ratio $P_{rM1}$ and $P_{rL1}$ of the rocker-arm vibrating machine and the unbroken ratio $P_{rM1}$ and $P_{rL1}$ of the piston vibrating machine, and recording their respective impact time $T_{rM1}$ and $T_{rL1}$ as well as $T_{pM1}$ and $T_{pL1}$, wherein $P_{rM1}$, $P_{rL1}$, $P_{pM1}$ and $P_{pL1}$ are within 45%-50%;

(S8) according to steps (S1)-(S7), performing impact tests of the high-grade samples, the medium-grade samples and the low-grade samples separately with the rocker-arm vibrating machine and the piston vibrating machine, wherein the unbroken ratios of the high-grade samples, the medium-grade samples and the low-grade samples are within 50%-55%; if an unbroken ratio of a sample is more than 55%, increasing corresponding impact time and performing the same impact test until the unbroken ratio is 50%-55%, and at this moment, recording the impact time $T_{rH2}$ and its unbroken ratio $P_{rH2}$ of the rocker-arm vibrating machine for the high-grade samples, the impact time $T_{rM2}$ and its unbroken ratio $P_{rM2}$ of the rocker-arm vibrating machine for the medium-grade samples, the impact time $T_{rL2}$ and its unbroken ratio $P_{rL2}$ of the rocker-arm vibrating machine for the low-grade samples, the impact time $T_{pH2}$ and its unbroken ratio $P_{pH2}$ of the piston vibrating machine for the high-grade samples, the impact time $T_{pM2}$ and its unbroken ratio $P_{pM2}$ of the piston vibrating machine for the medium-grade samples, and the impact time $T_{pL2}$ and its unbroken ratio $P_{pL2}$ of the piston vibrating machine for the low-grade samples;

(S9) separately calculating, according to Equations (1)-(3), impact times $T_{rH50}$, $T_{rM50}$, and $T_{rL50}$ of the rocker-arm vibrating machine for the high-grade samples, the medium-grade samples and the low-grade samples with an unbroken ratio of 50%; and separately converting the impact times $T_{rH50}$, $T_{rM50}$, and $T_{rL50}$ into their appropriate impact cycles $C_{rH50}$, $C_{rM50}$, and $C_{rL50}$:

$$C_{rH50} = \left[ T_{rH1} + \frac{(T_{rH1} - T_{rH2}) \times (50 - P_{rH1})}{(P_{rH1} - P_{rH2})} \right] \times f_r = T_{rH50} \times f_r; \quad (1)$$

-continued $$C_{rM50} = \left[T_{rM1} + \frac{(T_{rM1} - T_{rM2}) \times (50 - P_{rM1})}{(P_{rM1} - P_{rM2})}\right] \times f_r = T_{rM50} \times f_r; \text{ and} \quad (2)$$

$$C_{rL50} = \left[T_{rL1} + \frac{(T_{rL1} - T_{rL2}) \times (50 - P_{rL1})}{(P_{rL1} - P_{rL2})}\right] \times f_r = T_{rL50} \times f_r; \quad (3)$$

(S10) separately calculating, according to Equations (4)-(6), impact times $T_{pH50}$, $T_{pM50}$, and $T_{pL50}$ of the piston vibrating machine for the high-grade samples, the medium-grade samples and the low-grade samples with an unbroken ratio of 50%; and separately converting the impact times $T_{pH50}$, $T_{pM50}$, and $T_{pL50}$ into their appropriate impact cycles $C_{pH50}$, $C_{pM50}$, and $C_{pL50}$:

$$C_{pH50} = \left[T_{pH1} + \frac{(T_{pH1} - T_{pH2}) \times (50 - P_{pH1})}{(P_{pH1} - P_{pH2})}\right] \times f_p = T_{pH50} \times f_p; \quad (4)$$

$$C_{pM50} = \left[T_{pM1} + \frac{(T_{pM1} - T_{pM2}) \times (50 - P_{pM1})}{(P_{pM1} - P_{pM2})}\right] \times f_p = T_{pM50} \times f_p; \text{ and} \quad (5)$$

$$C_{pH50} = \left[T_{pM1} + \frac{(T_{pM1} - T_{pM2}) \times (50 - P_{pM1})}{(P_{pM1} - P_{pM2})}\right] \times f_p = T_{pH50} \times f_p; \quad (6)$$

(S11) separately calculating, according to Equations (7)-(9), impact cycle ratios $R_{H50}$, $R_{M50}$, and $R_{L50}$ of the impact cycles $C_{pH50}$, $C_{pM50}$, and $C_{pL50}$ to the impact cycles $C_{rH50}$, $C_{rM50}$, and $C_{rL50}$:

$$R_{H50} = \frac{C_{pH50}}{C_{rH50}}; \quad (7)$$

$$R_{M50} = \frac{C_{pM50}}{C_{rM50}}; \text{ and} \quad (8)$$

$$R_{L50} = \frac{C_{pL50}}{C_{rL50}}; \quad (9)$$

(S12) calculating, according to Equation (10), an average impact cycle ratio $r_{A50}$ of $R_{H50}$, $R_{M50}$ and $R_{L50}$:

$$r_{A50} = \frac{R_{H50} + R_{M50} + R_{L50}}{3}; \quad (10)$$

(S13) repeating steps (S1)-(S12) to obtain another average $r_{A50}'$; and averaging $r_{A50}$ and $r_{A50}'$ to obtain $R_{A50}$;

(S14) separately calculating the relative percentages of the high-grade sample, the medium-grade sample, and the low-grade sample according to $|R_{A50} - R_{x50}|/R_{A50}$, wherein x is H, M or L, $MAX|R_{A50} - R_{x50}|/R_{A50} = R_{D50max}/R_{A50}$; if any one of three relative percentages is not larger than 1.5% that is a given threshold, namely $R_{D50max}/R_{A50} \leq 1.5\%$, proceeding to step (S15); if at least one of the three relative percentages is larger than 1.5%, namely $R_{D50max}/R_{A50} > 1.5\%$, proceeding to step (S16); and if all the three relative percentages greatly exceed 1.5%, namely $R_{D50max}/R_{A50} >> 1.5\%$, or greatly exceed the given threshold, or an expected precision value of the equivalent test result is significantly less than the given threshold, proceeding to step (S17);

(S15) obtaining an impact cycle $C_{Nrx50}$ or $C_{Npx50}$ of its same new sample of any grade in the size specification $S_i$ by impacting the sample with the rocker-arm vibrating machine or the piston vibrating machine; and calculating the appropriate equivalent impact cycle $C_{Exp50}$ of the piston vibrating machine or the appropriate equivalent impact cycle $C_{Erx50}$ of the rocker-arm vibrating machine for the same sample according to Equation (11) or (12) without considering a grade relationship of the three relative percentages:

$$C_{Epx50} = R_{A50} \cdot C_{Nrx50}; \text{ and} \quad (11)$$

$$C_{Erx50} = \frac{C_{Npx50}}{R_{A50}}; \quad (12)$$

(S16) obtaining an impact cycle $C_{NrH50}$ or $C_{NpH50}$ of a new high-grade sample, an impact cycle $C_{NrM50}$ or $C_{NpM50}$ of a new medium-grade sample, and $C_{NrL50}$ or $C_{NpL50}$ of a new low-grade sample in the size specification $S_i$ by impacting these samples with the rocker-arm vibrating machine or the piston vibrating machine; and calculating its appropriate equivalent impact cycle $C_{EpH50}$ or $C_{ErH50}$ for the same new high-grade sample, its appropriate equivalent impact cycle $C_{EpM50}$ or $C_{ErM50}$ for the same new medium-grade sample and its appropriate equivalent impact cycle $C_{EpL50}$ or $C_{ErL50}$ for the same new low-grade sample for the piston vibrating machine or the rocker-arm vibrating machine according to Equations (13)-(18) in the case of considering the grade relationship of the three relative percentages:

$$C_{EpH50} = R_{H50} \cdot C_{NrH50}; \quad (13)$$

$$C_{ErH50} = \frac{C_{NpH50}}{R_{H50}}; \quad (14)$$

$$C_{EpM50} = R_{M50} \cdot C_{NrM50}; \quad (15)$$

$$C_{ErM50} = \frac{C_{NpM50}}{R_{M50}}; \quad (16)$$

$$C_{EpL50} = R_{L50} \cdot C_{NrL50}; \text{ and} \quad (17)$$

$$C_{ErL50} = \frac{C_{NpL50}}{R_{L50}}; \text{ and} \quad (18)$$

(S17) increasing the number of sample grades to 5 or 7; establishing equivalent calculation equations for 5 sample grades or 7 sample grades in the same size with reference to steps (S1)-(S16); and calculating equivalent test results between the rocker-arm vibrating machine and the piston vibrating machine according to the equivalent calculation equations newly established.

In some embodiments, the equivalent test method further comprises:

(S18) respectively converting equivalent impact cycles $C_{Epx50}$ and $C_{Erx50}$ into equivalent impact times $T_{Exp50}$ and $T_{Erx50}$ according to Equations (19)-(20) to obtain equivalent test results between the piston vibrating machine and the rocker-arm vibrating machine for individual grades of samples with the same size:

$$T_{Epx50} = C_{Epx50} \times f_p \quad (19); \text{ and}$$

$$T_{Erx50} = C_{Erx50} \times f_r \quad (20).$$

In some embodiments, the equivalent test method further comprises:

(S19) acquiring equivalent test results between the piston vibrating machine and the rocker-arm vibrating machine for all sample size specifications in each grade.

In a second aspect, this application provides a system for implementing the aforementioned equivalent test method.

In a third aspect, this application provides a use of the aforementioned equivalent test method in impact toughness testing of superabrasives.

In a fourth aspect, this application provides a use of the aforementioned system in impact toughness testing of superabrasives.

The beneficial effects of the present disclosure are described below.

In the present disclosure, three grades (i.e., high grade, medium grade and low grade) of a superabrasive with the same size are used as the comparison object of the equivalence relationship between two types of vibrating machines (i.e., a piston vibrating machine and a rocker-arm vibrating machine). By using a half-breakdown time method, a kind of same sample are respectively impacted with the piston vibrating machine or the rocker-arm vibrating machine to obtain their own impact times of unbroken ratio of 50%, And the impact times are converted into impact cycles, namely, semi-unbroken impact cycles. For the three grades of samples, their own ratios of the semi-unbroken impact cycles of the piston vibrating machine to those of the rocker-arm vibrating machine are calculated, so as to obtain the difference in the impact ratios between the two vibrating machines for the three grades of samples. The relative percentage deviation magnitudes of the impact cycle ratios or the linearity degree of the impact cycle ratios between the three grades of samples are analyzed to determine the calculating solution for the equivalent impact test results of the two vibrating machines. The equivalent impact test results for the two vibrating machines are calculated with the corresponding equations according to the relative percentage deviation magnitudes. For some size samples with severe non-linear features, the number of sample grades are increased to achieve high-precision equivalent test results for the two vibrating machines. The equivalent impact cycles can be converted into equivalent impact time according to the use need of the equivalent test results. Based on the above technical solutions, the present disclosure solves the difficult technical problem that the impact test results of the piston vibrating machine and the rocker-arm vibrating machine for the same sample with the half-breakdown time test method are different in the world, so that the test results of the completely different piston vibrating machine and rocker-arm vibrating machine on the same superabrasive sample with the half-breakdown time test method, which is most widely used in the world, can be equivalent by using the present disclosure, achieving the unification of test results of different impact equipment. This avoids the contradictions and disputes brought about by the inconsistency of test results in international trade of superabrasives, and also avoids the economic loss and waste brought about by replacing a type of vibrating machine with another type of vibrating machine. The equivalence method also has the advantage that once the sample is tested on one vibrating machine, the equivalent results of the sample to another vibrating machine can be obtained by calculation. This eliminates the consumption of labor, time, and sample and equipment wear caused by testing on another vibrating machine, and saves the test cost. The method provided herein achieves the unification of the test results of different test equipment, which facilitates the development of international trade, promotes academic exchanges in the field of superabrasives, and establishes a good environment for the international assessment of superabrasive quality.

DETAILED DESCRIPTION OF EMBODIMENTS

Figure 1:
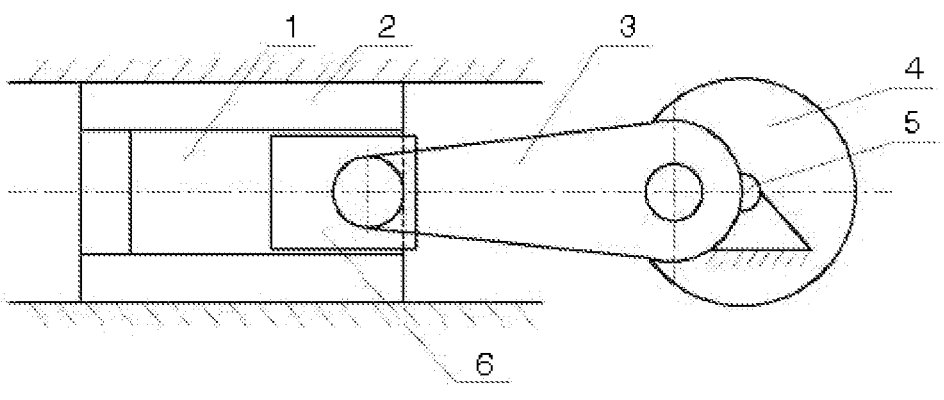
FIG. 1 is schematic diagram of a piston vibrating machine in the prior art.
Figure 2:
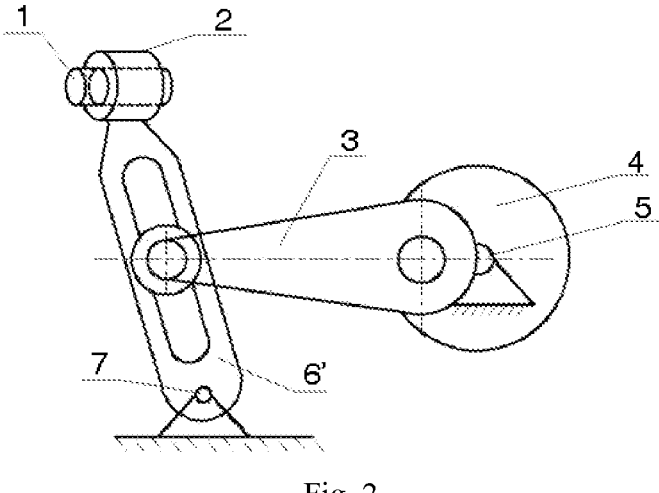
FIG. 2 is schematic diagram of a rocker-arm vibrating machine in the prior art.

The technical solutions of the present invention will be further described below with reference to the accompanying specific embodiments.

For three grades of samples (the high-grade sample, the medium-grade sample and the low-grade sample) with the same particle size, their half-breakdown impact cycles are measured by using a piston vibrating machine and a rocker-arm vibrating machine through the half-breakdown time test method to respectively calculate the half-breakdown impact cycle ratios of the three grades of samples impacted with the piston vibrating machines and the rocker-arm vibrating machine. Then, the average impact cycle ratio of the half-breakdown impact cycle ratios for the three grades is calculated. The relative percentages of the half-breakdown impact ratios for the three grades are calculated. A deviation limit for the relative percentages of the half-breakdown impact cycle ratios for the three grades is set (e.g., 1.5% or 2.0%). The relative percentages of the half-breakdown impact cycle ratios for the three grades of the samples are separately compared with the deviation limit to assess the linearity of the impulse ratios of the piston vibrating machine and the rocker-arm vibrating machine on the three grades of samples. The types of equations used for the equivalent calculation are further chosen or determined by the linearity of the impulse ratio. For the samples with a good linearity of the impulse ratios, the average of the half-breakdown impact cycle ratio of the three grade samples impacted with the two vibrating machines is used to calculate the equivalent test values. For the samples with a poor linearity of the impulse ratios, the half-breakdown impact cycle ratios of the three grades of samples impacted with the two vibrating machines are used to calculate the equivalence test values. In this way, the equivalent test values for each grade sample of the same size superabrasive tested by the piston vibrating machine and the rocker-arm vibrating machine can be obtained.

As described above, this application provides an equivalent test method for half breakdown time of a piston vibrating machine and a rocker-arm vibrating machine, which includes the following steps.

(S1) High-grade samples, medium-grade samples and low-grade samples of a size specification $S_i$ are selected, where i represents superabrasive size designation, and at least four batches of the same samples are prepared for each grade.

(S2) A vibration frequency $f_r$ and $f_p$ of the rocker-arm vibrating machine and the piston vibrating machine are respectively set as 2400 r/min and 1420 r/min.

(S3) The impact times $t_{rH1}$, $t_{rM1}$, and $t_{rL1}$ of the rocker-arm vibrating machine for the high-grade samples, the medium-grade samples and the low-grade samples are separately estimated, with which times the unbroken ratios of the three grade samples after being impacted can reach 45%-50%. The impact times $t_{pH1}$, $t_{pM1}$, and $t_{pL1}$ of the piston vibrating machine for the high-grade samples, the medium-grade samples and the low-grade samples are separately estimated, with which the unbroken ratios of the three grade samples after being impacted can reach 45%-50%.

(S4) An impact time $T_{rH1}$ of the rocker-arm vibrating machine for the high-grade samples is set up according to the estimated impact time $t_{rH1}$. One of the high-grade samples is loaded into a capsule of the rocker-arm vibrating machine. The capsule is installed in the rocker-arm vibrating machine, and the rocker-arm vibrating machine is started for impact test.

An impact time $T_{pH1}$ of the piston vibrating machine for the high-grade samples is set up according to the estimated impact time $t_{pH1}$. One of the high-grade samples is loaded into a capsule of the piston vibrating machine. The capsule is installed in the piston vibrating machine, and the piston vibrating machine is started for impact test.

(S5) The high-grade sample impacted by the rocker-arm vibrating machine with the impact time $T_{rH1}$ is sieved and weighed to obtain an unbroken ratio $P_{rH1}$. The high-grade sample impacted by the piston vibrating machine with the impact time $T_{pH1}$ is sieved and weighed to obtain an unbroken ratio $P_{pH1}$, where $P_{rH1}$ and $P_{pH1}$ are 45%-50%.

(S6) If the unbroken ratio $P_{rH1}$ or $P_{pH1}$ is less than 45%, the impact time of the rocker-arm vibrating machine or the piston vibrating machine is appropriately shortened, and steps (S4)-(S5) are repeated until the unbroken ratios $P_{rH1}$ and $P_{pH1}$ are within 45%-50%, and at this time, the impact time $T_{rH1}$ of the rocker-arm vibrating machine and its corresponding unbroken ratio $P_{rH1}$, and the impact time $T_{pH1}$ and its corresponding unbroken ratio $P_{pH1}$ of the piston vibrating machine on the high-grade sample are recorded.

(S7) According to steps (S4)-(S6), the medium-grade sample and the low-grade sample are respectively impacted by the rocker-arm vibrating machine or the piston vibrating machine with their corresponding estimated impact time $t_{rM1}$ and $t_{rL1}$ or $t_{pM1}$ and $t_{pL1}$, and then the impacted samples are sieved and weighed to obtain the unbroken ratio $P_{rM1}$ and $P_{rL1}$ of the rocker-arm vibrating machine and the unbroken ratio $P_{rM1}$ and $P_{rL1}$ of the piston vibrating machine, and their respective impact times $T_{rM1}$ and $T_{rL1}$ and $T_{pM1}$ and $T_{pL1}$ are recorded, where $P_{rM1}$, $P_{rL1}$, $P_{pM1}$ and $P_{pL1}$ are 45%-50%.

(S8) According to steps (S1)-(S7), the high-grade samples, the medium-grade samples and the low-grade samples are separately impacted by the rocker-arm vibrating machine and the piston vibrating machine, where the unbroken ratios of the high-grade samples, the medium-grade samples and the low-grade samples are 50%-55%. If an unbroken ratio of a sample is more than 55%, the corresponding impact time is increased and the same impact test is performed until the unbroken ratio is 50%-55%, and at this time, the impact time $T_{rH2}$ and its unbroken ratio $P_{rH2}$ of the rocker-arm vibrating machine for the high-grade samples, the impact time $T_{rM2}$ and its unbroken ratio $P_{rM2}$ of the rocker-arm vibrating machine for the medium-grade samples, the impact time $T_{rL2}$ and its unbroken ratio $P_{rL2}$ of the rocker-arm vibrating machine for the low-grade samples, the impact time $T_{pH2}$ and its unbroken ratio $P_{pH2}$ of the piston vibrating machine for the high-grade samples, the impact time $T_{pM2}$ and its unbroken ratio $P_{pM2}$ of the piston vibrating machine for the medium-grade samples, and the impact time $T_{pL2}$ and its unbroken ratio $P_{pL2}$ of the piston vibrating machine for the low-grade samples are recorded.

(S9) According to Equations (1)-(3), the impact times $T_{rH50}$, $T_{rM50}$, and $T_{rL50}$ of the rocker-arm vibrating machine for the high-grade samples, the medium-grade samples and the low-grade samples with an unbroken ratio of 50% are separately calculated and the impact times $T_{rH50}$, $T_{rM50}$, and $T_{rL50}$ are separately converted into their appropriate impact cycles $C_{rH50}$, $C_{rM50}$, and $C_{rL50}$:

$$C_{rH50} = \left[ T_{rH1} + \frac{(T_{rH1} - T_{rH2}) \times (50 - P_{rH1})}{(P_{rH1} - P_{rH2})} \right] \times f_r = T_{rH50} \times f_r; \quad (1)$$

$$C_{rM50} = \left[ T_{rM1} + \frac{(T_{rM1} - T_{rM2}) \times (50 - P_{rM1})}{(P_{rM1} - P_{rM2})} \right] \times f_r = T_{rM50} \times f_r; \text{ and} \quad (2)$$

$$C_{rL50} = \left[ T_{rL1} + \frac{(T_{rL1} - T_{rL2}) \times (50 - P_{rL1})}{(P_{rL1} - P_{rL2})} \right] \times f_r = T_{rL50} \times f_r. \quad (3)$$

(S10) According to Equations (4)-(6), the impact times $T_{pH50}$, $T_{pM50}$, and $T_{pL50}$ of the piston vibrating machine for the high-grade samples, the medium-grade samples and the low-grade samples with an unbroken ratio of 50% are separately calculated, and the impact times $T_{pH50}$, $T_{pM50}$, and $T_{pL50}$ are separately converted into their appropriate impact cycles $C_{pH50}$, $C_{pM50}$, and $C_{pL50}$:

$$C_{pH50} = \left[ T_{pH1} + \frac{(T_{pH1} - T_{pH2}) \times (50 - P_{pH1})}{(P_{pH1} - P_{pH2})} \right] \times f_p = T_{pH50} \times f_p; \quad (4)$$

$$C_{pM50} = \left[ T_{pM1} + \frac{(T_{pM1} - T_{pM2}) \times (50 - P_{pM1})}{(P_{pM1} - P_{pM2})} \right] \times f_p = T_{pM50} \times f_p; \text{ and} \quad (5)$$

$$C_{pH50} = \left[ T_{pM1} + \frac{(T_{pM1} - T_{pM2}) \times (50 - P_{pM1})}{(P_{pM1} - P_{pM2})} \right] \times f_p = T_{pH50} \times f_p. \quad (6)$$

(S11) According to Equations (7)-(9), the impact cycle ratios $R_{H50}$, $R_{M50}$, and $R_{L50}$ of the impact cycles $C_{pH50}$, $C_{pM50}$, and $C_{pL50}$ to the impact cycles $C_{rH50}$, $C_{rM50}$ and $C_{rL50}$ are separately calculated:

$$R_{H50} = \frac{C_{pH50}}{C_{rH50}}; \quad (7)$$

$$R_{M50} = \frac{C_{pM50}}{C_{rM50}}; \text{ and} \quad (8)$$

$$R_{L50} = \frac{C_{pL50}}{C_{rL50}}. \quad (9)$$

(S12) According to Equation (10), an average $r_{A50}$ of the impact cycle ratios $R_{H50}$, $R_{M50}$, and $R_{L50}$ is calculated:

$$r_{A50} = \frac{R_{H50} + R_{M50} + R_{L50}}{3}. \quad (10)$$

(S13) Steps (S1)-(S12) are repeated to obtain another average $r_{A50}'$, and $r_{A50}$ and $r_{A50}'$ are averaged to obtain a result $R_{A50}$.

Figure 3:
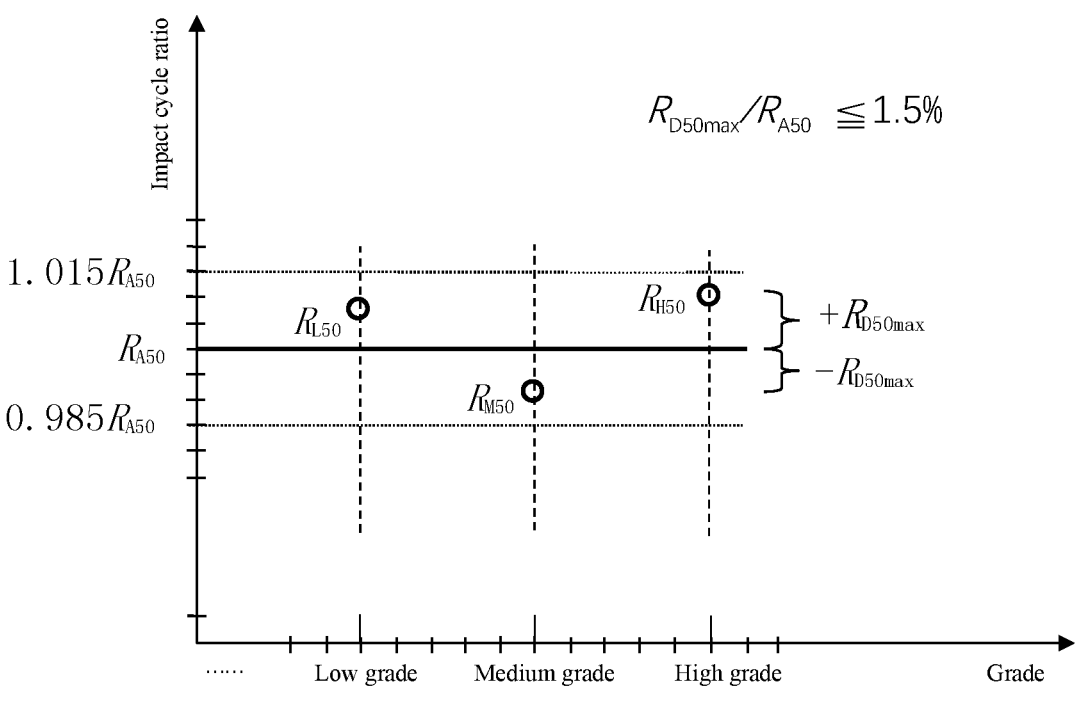
FIG. 3 graphically shows a relationship that the relative percentages related to a high-grade sample, a medium-grade sample and a low-grade sample are not larger than 1.5% according to an embodiment of the present disclosure.
Figure 4:
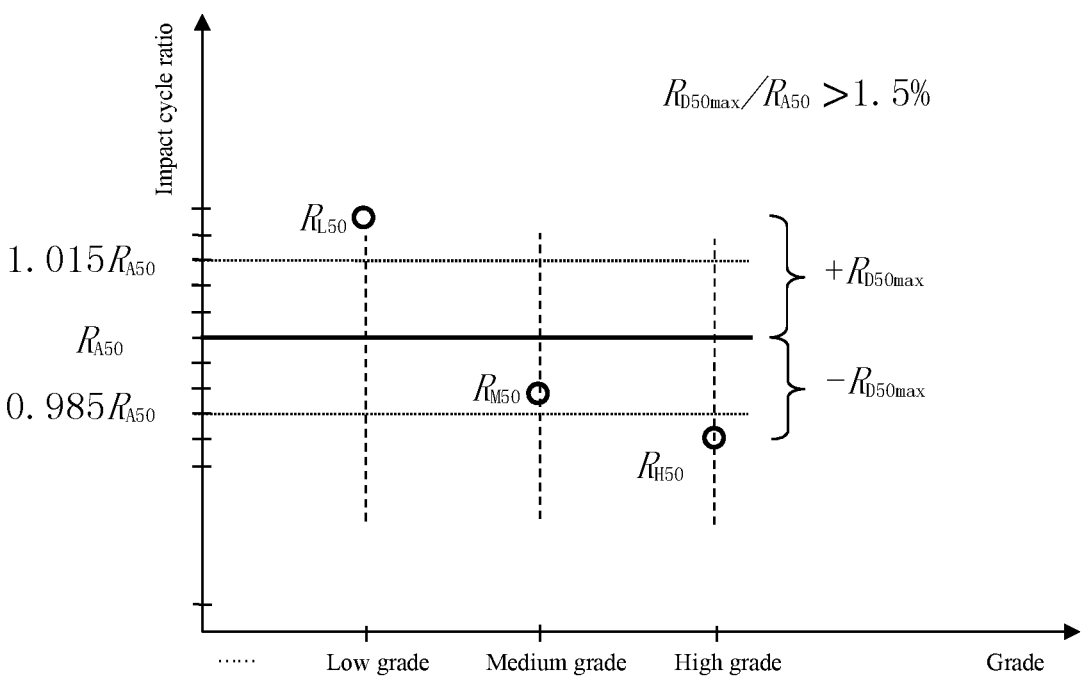
FIG. 4 graphically shows a relationship that the relative percentages related to a high-grade sample, a medium-grade sample and a low-grade sample are larger than 1.5% according to an embodiment of the present disclosure.
Figure 5:
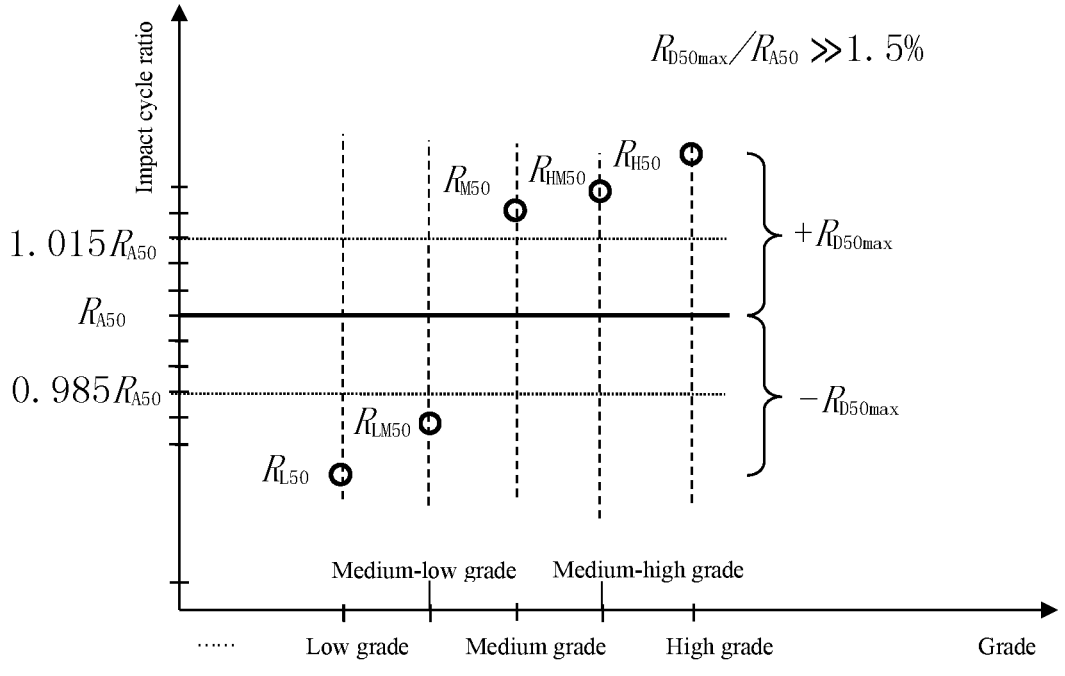
FIG. 5 graphically shows a relationship that the relative percentages related to a high-grade sample, a medium-grade sample, a middle-high-grade sample, a middle-low-grade sample, and a low-grade sample are greatly larger than 1.5% according to an embodiment of the present disclosure.

(S14) Relative percentages of the high-grade sample, the medium-grade sample, and the low-grade sample are respectively calculated according to $|R_{A50}-R_{x50}|/R_{A50}$, where x is H, M or L. For example, the relative percentage of the high-grade sample is represented by $[(R_{A50}-R_{H50})/R_{A50}]$. $MAX|R_{A50}-R_{x50}|/R_{A50}=R_{D50max}/R_{A50}$. If any one of the three relative percentages is not larger than 1.5% that is a given threshold, namely $R_{D50max}/R_{A50}\leq1.5\%$, as shown in FIG. 3, step (S15) is performed. If at least one of the three relative percentages is larger than 1.5%, namely $R_{D50max}/R_{A50}>1.5\%$, as shown in FIG. 4, step (S16) is performed. If all the three relative percentages are far larger than 1.5%, namely $R_{D50max}/R_{A50}>>1.5\%$, as shown in FIG. 5, for example larger than 3.0%, or greatly exceed the given threshold, or the expected precision value of the equivalent test result is significantly less than the given threshold, step (S17) is performed.

(S15) An impact cycle $C_{Nrx50}$ or $C_{Npx50}$ of its same new sample of any grade in the size specification $S_i$ is obtained by impacting the sample with the rocker-arm vibrating machine or the piston vibrating machine. The appropriate equivalent impact cycle $C_{Exp50}$ of the piston vibrating machine or the appropriate equivalent impact cycle $C_{Erx50}$ of or the rocker-arm vibrating machine for the same sample is calculated according to Equation (11) or (12) without considering a grade relationship of the three relative percentages:

$$C_{Epx50} = R_{A50} \cdot C_{Nrx50}; \text{ and} \qquad (11)$$

$$C_{Erx50} = \frac{C_{Npx50}}{R_{A50}}. \qquad (12)$$

(S16) An impact cycle $C_{NrH50}$ or $C_{NpH50}$ of the same new high-grade sample, an impact cycle $C_{NrM50}$ or $C_{NpM50}$ of the same new medium-grade sample, and $C_{NrL50}$ or $C_{NpL50}$ of the same new low-grade sample in the size specification $S_i$ are obtained by impacting these samples with the rocker-arm vibrating machine or the piston vibrating machine. Its appropriate equivalent impact cycle $C_{EpH50}$ or $C_{ErH50}$ for the same new high-grade sample, its appropriate equivalent impact cycle $C_{EpM50}$ or $C_{ErM50}$ for the same new medium-grade sample and its appropriate equivalent impact cycle $C_{EpL50}$ or $C_{ErL50}$ for the same new low-grade sample for the piston vibrating machine or the rocker-arm vibrating machine are calculated according to Equations (13)-(18) in the case of considering the grade relationship of the three relative percentages:

$$C_{EpH50} = R_{H50} \cdot C_{NrH50}; \qquad (13)$$

$$C_{ErH50} = \frac{C_{NpH50}}{R_{H50}}; \qquad (14)$$

$$C_{EpM50} = R_{M50} \cdot C_{NrM50}; \qquad (15)$$

$$C_{ErM50} = \frac{C_{NpM50}}{R_{M50}}; \qquad (16)$$

$$C_{EpL50} = R_{L50} \cdot C_{NrL50}; \text{ and} \qquad (17)$$

-continued
$$C_{ErL50} = \frac{C_{NpL50}}{R_{L50}}. \qquad (18)$$

(S17) The number of sample grades is increased to 5 or 7, as shown in FIG. 5. In this case of severe non-linearity in relative percentages, equivalent calculation equations for 5 sample grades or 7 sample grades in the same size are established with reference to steps (S1)-(S16), and equivalent test results between the rocker-arm vibrating machine and the piston vibrating machine are calculated according to the equivalent calculation equations newly established.

(S18) After the relevant parameters for equivalent testing between the piston vibrating machine and the rocker-arm vibrating machine (e.g., $C_{rH50}$, $C_{rM50}$, $C_{rL50}$, $C_{pH50}$, $C_{pM50}$, $C_{pL50}$, $R_{A50}$, $R_{H50}$, $R_{M50}$, $R_{L50}$, and so on) are established, an equivalent test result of a new sample for one vibrating machine can be calculated by a test result of the same size sample impacted with another vibrating machine without actual measurement. In the equivalent test method provided herein, the equivalent impact cycle can be converted into equivalent impact time, and the two parameters are interchangeable. The equivalent impact cycles $C_{Epx50}$ and $C_{Erx50}$ are converted into the equivalent impact times $T_{Epx50}$ and $T_{Erx50}$ according to Equations (19)-(20):

$$T_{Epx50}=C_{Epx50}\times f_p \qquad (19); \text{ and}$$

$$T_{Erx50}=C_{Erx50}\times f_r \qquad (20).$$

In this way, equivalent test results between the piston vibrating machine and the arm-rocker vibrating machine for each grade of the samples with the same size can be obtained.

(S19) Equivalent test results of the piston vibrating machine and the rocker vibrating machine for each grade of superabrasive in various sizes are acquired. After the relevant parameters for equivalence testing between the piston vibrating machine and rocker-arm vibrating machine have been established for all sample size specifications $S_{D851}$ to $S_{D46}$ and $S_{B301}$ to $S_{B46}$, this equivalent test method will be universally applicable for equivalence testing of superabrasives of all sizes.

The equivalent test method provided herein is validated by actual test certifications, the relevant data is shown in Table 1, which verifies that the equivalent test method provided herein is very effective. Diamond samples of size D426 with a weight of 0.4 g per impact are used for the tests. The samples are divided into three grades, namely, a high-grade sample, a medium-grade sample and a low-grade sample. BY using the half-breakdown time method, the tests are conducted with a piston vibrating machine and a rocker-arm vibrating machine respectively to acquire the half-breakdown time and half-breakdown cycle of the three grades of samples. Then, the impact cycle ratios $R_{x50}$ of the three grades, the average ratio $R_{A50}$ and the relative percentage of the impact cycle of the three grades of samples are calculated. As the relative percentages of the three grades of sample are 0.0%,-2.9%, and 1.9%, respectively, where two of the three values are greater than 1.5%, then the equations for equivalence tests of the two vibrating machines should be selected to be of a graded algorithm. The high-grade sample, the medium-grade sample and the low-grade sample are newly selected from the samples of size D426 and are tested with the rocker-arm vibrating machine and the piston vibrating machine respectively by using the half-breakdown time method. The test results of the rocker vibrating machine are used to calculate the equivalent test results of the piston vibrating machine according to the equations provided in the present disclosure, and then the equivalent test results of the piston vibrating machine are subtracted from the actual test results of the piston vibrating machine, expressed by $(C_{Epx50}-C_{Npx50})$. The differences between the calculated equivalent cycles and the actual test cycles for the three grades for a piston vibrating machine are very small, and are −62 (r), 8 (r) and 49 (r) for the three grades respectively, which are −0.9%, 0.1% and 0.9% of the measured values respectively, significantly less than the required test accuracy of 1.5% (positive and negative numbers are not counted, and the comparison is performed in absolute values).

than those of the third samples; i represents superabrasive size designation; and at least four batches of the same samples are prepared for each grade;

(S2) separately setting a vibration frequency $f_r$ of the rocker-arm vibrating machine and a vibration frequency $f_p$ of the piston vibrating machine;

(S3) separately estimating impact times $t_{rH1}$, $t_{rM1}$, and $t_{rL1}$ of the rocker-arm vibrating machine for the first samples, the second samples and the third samples, with which times unbroken ratios of the three grade samples after being impacted can reach 45%-50%; and separately estimating impact times $t_{pH1}$, $t_{pM1}$, and $t_{pL1}$ of the piston vibrating machine for the first samples, the

TABLE 1

Certification test of the equivalence test method for a piston vibrating machine and a rocker-arm vibrating machine by using a half-breakdown time method
Sample size D426(40/45)
Sample weight 0.4 g

| | PVM (1420 Hz) | | RVM (2400 Hz) | | | | |
|---|---|---|---|---|---|---|---|
| Sample grade | HBT (s) | HBC (r) | HBT (s) | HBC (r) | RoHBC | ARoHBC | RP |
| High grade | $T_{pH50}$ = 278 | $C_{pH50}$ = 6583 | $T_{rH50}$ = 161 | $C_{rH50}$ = 6458 | $R_{H50}$ = 1.02 | 1.02% | 0.0% |
| Middle grade | $T_{pM50}$ = 249 | $C_{pM50}$ = 5891 | $T_{rM50}$ = 141 | $C_{rM50}$ = 5630 | $R_{M50}$ = 1.05 | | −2.9% |
| Low grade | $T_{pL50}$ = 178 | $C_{pL50}$ = 4202 | $T_{rL50}$ = 105 | $C_{rL50}$ = 4208 | $R_{L50}$ = 1.00 | | 1.9% |

| Sample grades | ATRR | EHBCP | ATRP | DOERAATR | PROPD |
|---|---|---|---|---|---|
| High grade | $C_{NrH50}$ = 6422 | $C_{EpH50}$ = 6550 | $C_{NpH50}$ = 6612 | −62 (r) | −0.9% |
| Middle grade | $C_{NrM50}$ = 5630 | $C_{EpM50}$ = 5911 | $C_{NpM50}$ = 5903 | 8 (r) | 0.1% |
| Low grade | $C_{NrL50}$ = 5533 | $C_{EpL50}$ = 5533 | $C_{NpL50}$ = 5484 | 49 (r) | 0.9% |

Noted:
PVM denotes a piston vibrating machine;
RVM denotes a rocker-arm vibrating machine;
HBT denotes half-breakdown time ($T_{px50}$ or $T_{rx50}$);
HBC denotes a half-breakdown cycle ($C_{px50}$ or $C_{rx50}$);
RoHBC denotes the ratio of the half-breakdown impact cycle of the piston vibrating machine to the rocker vibrating machine ($R_{x50} = C_{px50}/C_{rx50}$);
ARoHBC denotes the average ratio of the half-breakdown impact cycle of the piston vibrating machine to the rocker vibrating machine ($R_{450}$);
RP denotes the relative percentage of the impact cycle ratio [$(R_{450} - R_{x50})/R_{450}$];
ATRR denotes the actual test result of the rocker-arm vibrating machine ($C_{Nrx50}$);
EHBCP denotes the equivalent test result of half-breakdown cycle of the piston vibrating machine ($C_{Epx50} = R_{x50} \cdot C_{Nrx50}$);
ATRP denotes the actual test result of the piston vibrating machine ($C_{Npx50}$);
DOERAATR denotes a cycle difference between the equivalent test result of the piston vibrating machine and the actual test result of the piston vibrating machine ($C_{Epx50} - C_{Npx50}$); and
PROPD denotes the percentage of the cycle difference to the actual test result of the piston vibrating machine [$(C_{Epx50} - C_{Npx50})/C_{Npx50}$].

Described above are merely preferred embodiments of the present invention, which are not intended to limit the present invention. Though the present invention has been described in detail above, one of ordinary skill in the art can still make various modifications and variations to the embodiments provided herein. It should be noted that those modifications and variations made without departing from the spirit and scope of the present invention shall fall within the scope of the present invention defined by the appended claims.

What is claimed is:

1. An equivalent test method of a piston vibrating machine and a rocker-arm vibrating machine applied in half breakdown time test, comprising:

(S1) selecting first samples, second samples and third samples of a size specification $S_i$; wherein grades of the first samples are higher than those of the second samples, and grades of the second samples are higher second samples and the third samples, with which unbroken ratios of the samples after being tested can reach 45%-50%;

(S4) setting up an impact time $T_{rH1}$ of the rocker-arm vibrating machine for the first samples according to the estimated impact time $t_{rH1}$; loading one of the first samples into a capsule of the rocker-arm vibrating machine;

installing the capsule in the rocker-arm vibrating machine; and starting the rocker-arm vibrating machine for impact test; and setting up an impact time $T_{pH1}$ of the piston vibrating machine for the first samples according to the estimated impact time $t_{pH1}$; loading another of the first samples into a capsule of the piston vibrating machine; installing the capsule in the piston vibrating machine; and starting the piston vibrating machine for the impact test;

(S5) sieving and weighing an impacted first sample from the rocker-arm vibrating machine with the impact time $T_{rH1}$ to obtain an unbroken ratio $P_{rH1}$;

and sieving and weighing an impacted first sample from the piston vibrating machine with the impact time $T_{pH1}$ to obtain an unbroken ratio $P_{pH1}$, wherein $P_{rH1}$ and $P_{pH1}$ are 45%-50%;

(S6) if the unbroken ratio $P_{rH1}$ Or $P_{pH1}$ is less than 45%, appropriately shortening the impact time of the rocker-arm vibrating machine or the piston vibrating machine, repeating steps (S4)-(S5) until the unbroken ratios $P_{rH1}$ and $P_{pH1}$ are within 45%-50%, and at this time, recording the impact time $T_{rH1}$ of the rocker-arm vibrating machine and its corresponding unbroken ratio $P_{rH1}$, and the impact time $T_{pH1}$ of the piston vibrating machine and its corresponding unbroken ratio $P_{pH1}$;

(S7) according to steps (S4)-(S6), respectively impacting the second sample and the third sample with the rocker-arm vibrating machine or the piston vibrating machine with their corresponding estimated impact time $t_{rM1}$ and $t_{rL1}$ or $t_{pM1}$ and $t_{pL1}$ and then sieving and weighing the impacted samples to obtain the unbroken ratio $P_{rM1}$ and $P_{rL1}$ of the rocker-arm vibrating machine and the unbroken ratio $P_{rM1}$ and $P_{rL1}$ of the piston vibrating machine, and recording their respective impact times $T_{rM1}$ and $T_{rL1}$ and $T_{pM1}$ and $T_{pL1}$, wherein $P_{rM1}$, $P_{rL1}$, $P_{pM1}$ and $P_{pL1}$ are within 45%-50%;

(S8) according to steps (S1)-(S7), performing impact tests of the first samples, the second samples and the third samples separately with the rocker-arm vibrating machine and the piston vibrating machine, wherein unbroken ratios of the first samples, the second samples and the third samples are within 50%-55%; if an unbroken ratio of a sample is more than 55%, increasing corresponding impact time and performing the same impact test until the unbroken ratio is within 50%-55%, and at this moment, recording the impact time $T_{rH2}$ and its unbroken ratio $P_{rH2}$ of the rocker-arm vibrating machine for the first samples, the impact time $T_{rM2}$ and its unbroken ratio $P_{rM2}$ of the rocker-arm vibrating machine for the second samples, the impact time $T_{rL2}$ and its unbroken ratio $P_{rL2}$ of the rocker-arm vibrating machine for the third samples, the impact time $T_{pH2}$ and its unbroken ratio $P_{pH2}$ of the piston vibrating machine for the first samples, the impact time $T_{pM2}$ and its unbroken ratio $P_{pM2}$ of the piston vibrating machine for the medium grade second samples, and the impact time $T_{pL2}$ and its unbroken ratio $P_{pL2}$ of the piston vibrating machine for the third samples;

(S9) separately calculating, according to Equations (1)-(3), impact times $T_{rH50}$, $T_{rM50}$, and $T_{rL50}$ of the rocker-arm vibrating machine for the first samples, the second samples and the third samples with an unbroken ratio of 50%; and separately converting the impact times $T_{rH50}$, $T_{rM50}$, and $T_{rL50}$ into their appropriate impact cycles $C_{rH50}$, $C_{rM50}$, and $C_{rL50}$:

$$C_{rH50} = \left[T_{rH1} + \frac{(T_{rH1} - T_{rH2}) \times (50 - P_{rH1})}{(P_{rH1} - P_{rH2})}\right] \times f_r = T_{rH50} \times f_r; \quad (1)$$

$$C_{rM50} = \left[T_{rM1} + \frac{(T_{rM1} - T_{rM2}) \times (50 - P_{rM1})}{(P_{rM1} - P_{rM2})}\right] \times f_r = T_{rM50} \times f_r; \text{ and} \quad (2)$$

$$C_{rL50} = \left[T_{rL1} + \frac{(T_{rL1} - T_{rL2}) \times (50 - P_{rL1})}{(P_{rL1} - P_{rL2})}\right] \times f_r = T_{rL50} \times f_r; \quad (3)$$

(S10) separately calculating, according to Equations (4)-(6), impact times $T_{pH50}$, $T_{pM50}$, and $T_{pL50}$ of the piston vibrating machine for the first samples, the second samples and the third samples with an unbroken ratio of 50%; and separately converting the impact times $T_{pH50}$, $T_{pM50}$, and $T_{pL50}$ into their appropriate impact cycles $C_{pH50}$, $C_{pM50}$, and $C_{pL50}$:

$$C_{pH50} = \left[T_{pH1} + \frac{(T_{pH1} - T_{pH2}) \times (50 - P_{pH1})}{(P_{pH1} - P_{pH2})}\right] \times f_p = T_{pH50} \times f_p; \quad (4)$$

$$C_{pM50} = \left[T_{pM1} + \frac{(T_{pM1} - T_{pM2}) \times (50 - P_{pM1})}{(P_{pM1} - P_{pM2})}\right] \times f_p = T_{pM50} \times f_p; \text{ and} \quad (5)$$

$$C_{pH50} = \left[T_{pM1} + \frac{(T_{pM1} - T_{pM2}) \times (50 - P_{pM1})}{(P_{pM1} - P_{pM2})}\right] \times f_p = T_{pH50} \times f_p; \quad (6)$$

(S11) separately calculating, according to Equations (7)-(9), impact cycle ratios $R_{H50}$, $R_{M50}$, and $R_{L50}$ of the impact cycles $C_{pH50}$, $C_{pM50}$, and $C_{pL50}$ to the impact cycles $C_{rH50}$, $C_{rM50}$ and $C_{rL50}$:

$$R_{H50} = \frac{C_{pH50}}{C_{rH50}}; \quad (7)$$

$$R_{M50} = \frac{C_{pM50}}{C_{rM50}}; \text{ and} \quad (8)$$

$$R_{L50} = \frac{C_{pL50}}{C_{rL50}}; \quad (9)$$

(S12) calculating, according to Equation (10), an average $r_{A50}$ of the ratios $R_{H50}$, $R_{M50}$, and $R_{L50}$:

$$r_{A50} = \frac{R_{H50} + R_{M50} + R_{L50}}{3}; \quad (10)$$

(S13) repeating steps (S1)-(S12) to obtain another average $r'_{A50}$, and averaging $r_{A50}$ and $r'_{A50}$ to obtain $R_{A50}$;

(S14) separately calculating the relative percentages of the first sample, the second sample, and the third sample according to $|R_{A50}-R_{x50}|/R_{A50}$, wherein x is H, M or L, $\text{MAX}|R_{A50}-R_{x50}|/R_{A50}=R_{D50max}/R_{A50}$;

if any one of three relative percentages is not larger than 1.5% that is a given threshold, namely $R_{D50max}/R_{A50}<=1.5\%$, proceeding to step (S15); if at least one of the three relative percentages is larger than 1.5%, namely $R_{D50max}/R_{A50}>1.5\%$, proceeding to step (S16); and if all the three relative percentages exceed 3.0% or an expected precision value of the equivalent test result is significantly less than the given threshold, proceeding to step (S17);

(S15) obtaining an impact cycle $C_{Nrx50}$ or $C_{Npx50}$ of its same new sample of any grade in the size specification $S_i$ by impacting the sample with the rocker-arm vibrating machine or the piston vibrating machine; and calculating its appropriate equivalent impact cycle $C_{Epx50}$ of the piston vibrating machine or its appropriate equivalent impact cycle $C_{Erx50}$ of the rocker-arm vibrating machine for the same samples according to Equation (11) or (12) without considering a grade relationship of the three relative percentages:

$$C_{Epx50} = R_{A50} \cdot C_{Nrx50}; \text{ and} \quad (11)$$

-continued $$C_{Erx50} = \frac{C_{Npx50}}{R_{A50}}. \tag{12}$$

(S16) obtaining an impact cycle $C_{NrH50}$ Or $C_{NpH50}$ of the same new first sample, an impact cycle $C_{NrM50}$ Or $C_{NpM50}$ of the same new second sample, and $C_{NrL50}$ or $C_{NpL50}$ of the same new third sample in the size specification $S_i$ by impacting these samples with the rocker-arm vibrating machine or the piston vibrating machine; and calculating its appropriate equivalent impact cycle $C_{EpH50}$ or $C_{ErH50}$ for the same new first sample, its appropriate equivalent impact cycle $C_{EpM50}$ or $C_{ErM50}$ for the same new second sample and its appropriate equivalent impact cycle $C_{EpL50}$ or $C_{ErL50}$ for the same new third sample for the piston vibrating machine and the rocker-arm vibrating machine according to Equations (13)-(18) in the case of considering the grade relationship of the three relative percentages:

$$C_{EpH50} = R_{H50} \cdot C_{NrH50}; \tag{13}$$

$$C_{ErH50} = \frac{C_{NpH50}}{R_{H50}}; \tag{14}$$

$$C_{EpM50} = R_{M50} \cdot C_{NrM50}; \tag{15}$$

$$C_{ErM50} = \frac{C_{NpM50}}{R_{M50}}; \tag{16}$$

$$C_{EpL50} = R_{L50} \cdot C_{NrL50}; \text{ and} \tag{17}$$

$$C_{ErL50} = \frac{C_{NpL50}}{R_{L50}}; \text{ and} \tag{18}$$

(S17) increasing the number of sample grades to 5 or 7; establishing equivalent calculation equations for 5 sample grades or 7 sample grades in the same size with reference to steps (S1)-(S16); and calculating equivalent test results between the rocker-arm vibrating machine and the piston vibrating machine according to the equivalent calculation equations newly established.

2. The equivalent test method of claim 1, further comprising:

(S18) respectively converting equivalent impact cycles $C_{Epx50}$ and $C_{Erx50}$ into equivalent impact times $T_{Epx50}$ and $T_{Erx50}$ according to Equations (19)-(20) to obtain equivalent test results between the piston vibrating machine and the rocker-arm vibrating machine for individual grades of samples with the same size:

$$T_{Epx50} = C_{Epx50} \times f_p \tag{19; and}$$

$$T_{Erx50} = C_{Erx50} \times f_r \tag{20.}$$

3. The equivalent test method of claim 2, further comprising:

(S19) acquiring equivalent test results between the piston vibrating machine and the rocker-arm vibrating machine for all sample size specifications in each grade.

4. The equivalent test method of claim 1, wherein i is selected from D851 to D46 for diamonds, or from B301 to B46 for cubic boron nitrides.

5. The equivalent test method of claim 1, wherein in step (S2), $f_r$ is set to 2400 r/min.

6. The equivalent test method of claim 1, wherein in step (S2), $f_p$ is set to 1420 r/min.

7. The equivalent test method of claim 1, wherein in step (S14), the expected precision value of the equivalent test result is 1.0%.

8. A system for implementing the equivalent test method of claim 1.

\* \* \* \* \*